United States Patent [19]

Burkhardt

[11] 4,229,647
[45] Oct. 21, 1980

[54] COUNTER SYSTEM FOR INCREMENTAL MEASURING INSTRUMENT

[75] Inventor: Horst Burkhardt, Truchtlaching, Fed. Rep. of Germany

[73] Assignee: Dr. Johannes Heidenhain GmbH, Traunreut, Fed. Rep. of Germany

[21] Appl. No.: 923,810

[22] Filed: Jul. 12, 1978

[30] Foreign Application Priority Data

Jul. 21, 1977 [DE] Fed. Rep. of Germany ....... 2732909

[51] Int. Cl.³ .............................................. G06M 3/06
[52] U.S. Cl. .......................... 235/92 GC; 235/92 FP; 235/92 PL; 235/92 PE; 235/92 MP
[58] Field of Search ........ 235/92 GC, 92 MP, 92 PE, 235/92 EA, 92 ST, 92 FP, 92 PL; 250/237 G; 356/106; 350/110

[56] References Cited

U.S. PATENT DOCUMENTS

| 3,811,648 | 5/1974 | Ream et al. | 235/92 MP |
| 3,872,288 | 3/1975 | Sampey | 235/92 DN |
| 3,962,563 | 6/1976 | Schulz-Methke | 235/92 MP |
| 3,982,106 | 9/1976 | Stutz | 235/92 GC |
| 4,107,516 | 8/1978 | Hvidsten | 235/92 MP |

Primary Examiner—Joseph M. Thesz
Attorney, Agent, or Firm—Hume, Clement, Brinks, Willian & Olds, Ltd.

[57] ABSTRACT

An improved electronic counter for use with an incremental measuring device is disclosed. The counter includes two or more individual counters, a display unit, and a switch for selectively connecting any one of the individual counters with the display unit. Each of the individual counters may be individually set to a separate zero point so that each counter may be used to store a position value in a separate frame of reference. The position value stored in any one of the individual counters may be switched to the display unit without disturbing the contents of the other individual counters. In the preferred embodiment, the counter includes a circuit for automatically resetting a first individual counter to zero whenever the measuring device senses a predetermined reference mark, thereby automatically maintaining a calibrated zero point in that counter. The preferred embodiment also includes a power fail circuit which generates a warning signal when the measuring device is operated following an interruption in the line voltage used to power the device. This warning signal is maintained until the first individual counter is automatically reset, and the device is again calibrated for use.

9 Claims, 1 Drawing Figure

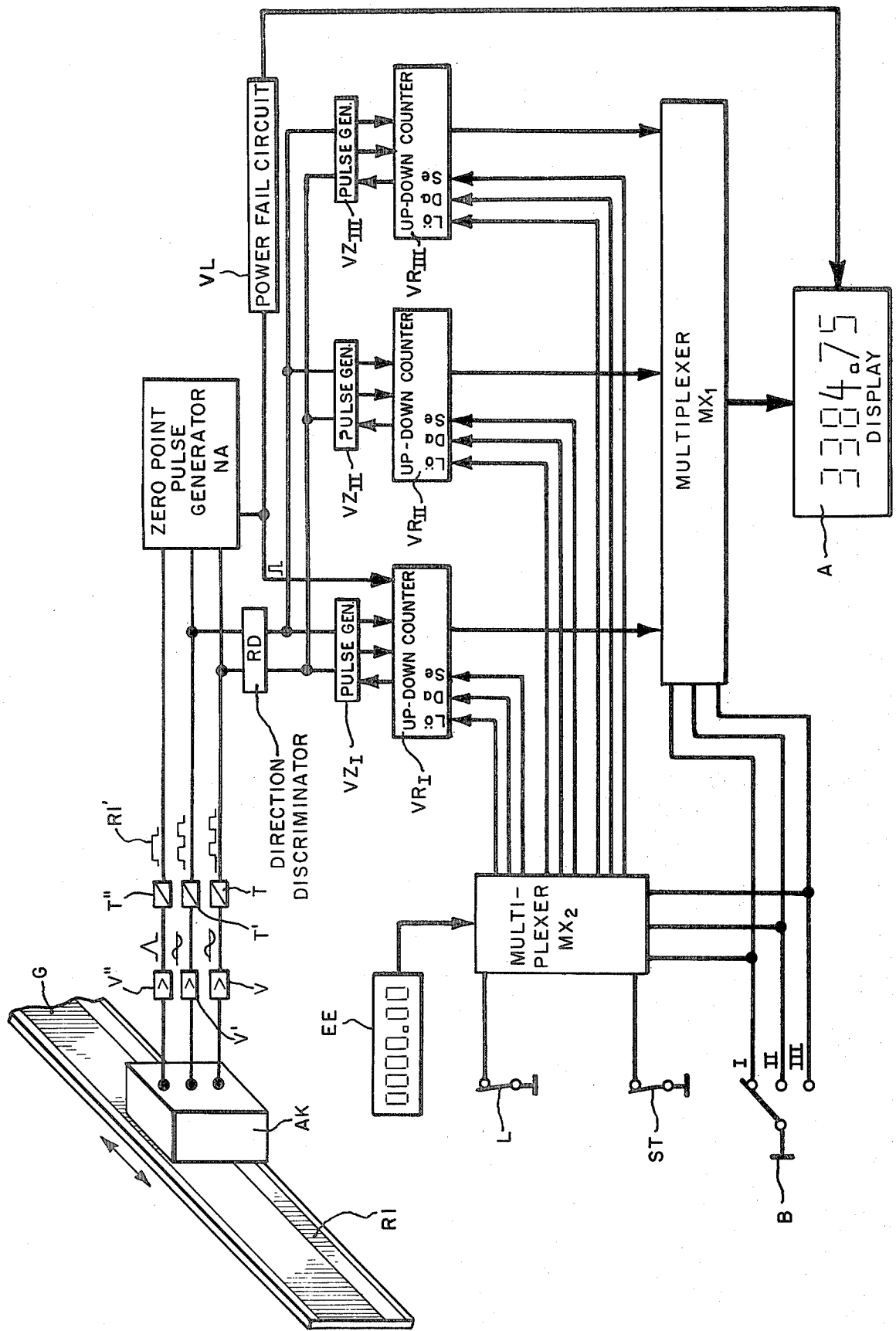

COUNTER SYSTEM FOR INCREMENTAL MEASURING INSTRUMENT

BACKGROUND OF THE INVENTION

This invention relates to an improved electronic counter for use with incremental measuring devices of the type used for positioning or measuring the relative position of two parts of a machine or the like. The aforementioned parts may be the slide and the bed of a tooling or measuring machine, for example.

Incremental measuring devices are commonly designed to operate in several different measuring modes, generally including an absolute measurement mode and a relative measurement mode. In the absolute mode the zero point for the measurement is provided by a fixed reference mark on the measuring device, a machine zero point, and all measurements are made with respect to this reference mark. In the relative mode the zero point for the measurement is arbitrarily set at a convenient point and measurements are made relative to the particular zero point in use at any given time. Incremental angle and position measuring devices of the prior art are subject to errors introduced when the device is alternately used in the absolute and relative measuring modes.

SUMMARY OF THE INVENTION

The present invention is directed to an improved electronic counter for incremental measuring devices which permits any of a plurality of measuring or positioning modes to be alternately employed without introducing errors into the measurement. This improved counter is versatile, easy to operate, and dependable.

The improved counter of this invention includes a plurality of electronic circuits for operating the counter in several measurement modes or reference systems and switching means for changing between these reference systems in such a way that in one of the switch positions there is recallable the reference system referred to the absolute zero point (machine zero point) and in at least one further switch position there is selectable or recallable a system referred to freely selectable zero or reference points.

According to a further feature of the invention a reference pulse, whose position is absolutely established for the division and measuring arrangement, brings about the setting of the absolute machine zero point. Further features of the invention are found in the claims.

The invention offers the following important advantages:

1. An absolute reference system and any other selected reference system can at any time be selected or recalled. In this way the measuring device can easily be switched between separate measurement modes and several separate reference systems can be simultaneously maintained (for example, an absolute reference system and one or more relative reference systems);
2. The zero point of any of the relative reference systems can be changed at will without disturbing the absolute reference system, and
3. The operation of the counter and the measuring arrangement is both simple and versatile.

The invention itself, together with further objects and attendant advantages will be best understood by reference to the following description taken in conjunction with the accompanying drawing.

BRIEF DESCRIPTION OF THE DRAWING

The drawing is a block circuit diagram of a preferred embodiment of the invention.

DETAILED DESCRIPTION OF A PREFERRED EMBODIMENT

Referring now to the drawing, an incremental measuring system for measuring the relative position of two parts of a machine or the like is there shown. This measuring system includes a grid scale G and a scanning head AK which generates position dependent signals that are amplified in a known manner in amplifiers V and V' and then applied to trigger circuits T,T'. The pulsed outputs of the trigger circuits T,T' are applied to a direction discriminator RD which in turn controls pulse generators $VZ_I$, $VZ_{II}$ and $VZ_{III}$. The pulses thereby generated are counted in up-down counters $VR_I$, $VR_{II}$, and $VR_{III}$. These individual components of this circuit are well known in the art and will not be described in detail here.

A so-called zero pulse track RI on the grid scale G delivers a reference signal RI', the position of which is absolutely fixed with respect to the scale G of the measuring system. This reference signal RI' is amplified in amplifier V" and applied to a trigger circuit T". The shaped signal is then applied to a zero point pulse generator NA, which evaluates it and applies it to the up-down counter $VR_I$. The up-down counters $VR_I$, $VR_{II}$, and $VR_{III}$ continuously count the pulses generated by the incremental measuring system. A switch B has three positions I, II and III, with the aid of which any of three different reference systems can be selected for display. In each of the three switch positions I, II, or III a connection is established in a multiplexer $MX_1$ between one of the up-down counters $VR_I$, $VR_{II}$, or $VR_{III}$ and a display unit A. When the switch B is placed in position I, II or III, the contents of the up-down counters $VR_I$, $VR_{II}$, or $VR_{III}$, respectively, are displayed in the display unit A.

Each of the three counters $VR_I$, $VR_{II}$, and $VR_{III}$ can be used to store the instantaneous position of the grid scale in a separate reference frame. In this preferred embodiment the counter $VR_I$ is used for absolute position measurements. The above-described reference pulse RI', which is positioned at a fixed point with respect to the grid scale G of the measuring system, is used to repeatedly calibrate the counter $VR_I$ by setting the counter $VR_I$ to zero. Thus, whenever the scanning unit AK passes over the machine or absolute zero point, the reference pulse RI' causes the counter to be reset to zero. In this way an absolute reference frame is automatically maintained in the first counter $VR_I$.

The switch position II of the switch B is associated with the up-down counter $VR_{II}$, which is not tied to the absolute reference frame of counter $VR_I$. Counter $VR_I$ can be used, for example, to store position measurements based on a working zero point. In many instances the working zero point can be derived advantageously from an edge of a workpiece to be tooled.

A third reference system, which is associated with the switch position III and the up-down counter $VR_{III}$, is freely disposable for ever-changing reference points. This reference system may be used, for example, in the treatment of workpieces that are scaled using chain measurements. In the third reference system, therefore, a measurement can be stored in a momentary reference frame. By virtue of the switch B and the separate counters $VR_I$, $VR_{II}$, and $VR_{III}$ three separate reference systems can be simultaneously retained and displayed at will. Because the three counters $VR_I$, $VR_{II}$, and $VR_{III}$ are independent, the zero point in any one counter can be changed without disturbing the calibration of the other two.

In order to be able to erase or set the up-down counters $VR_I$, $VR_{II}$, and $VR_{III}$ to a predetermined value, an erasing key L and a setting key ST are preferably provided. An input unit EE serves for the input of an arbitrary setting value. A second multiplexer $MX_2$ is controlled by the switch B to establish the connection with the appropriate up-down counter $VR_I$, $VR_{II}$, or $VR_{III}$ according to the switch position I, II, III and switches the input unit EE onto the selected up-down counter $VR_I$, $VR_{II}$, or $VR_{III}$. With the aid of the multiplexer $MX_2$, therefore, any of the up-down counters $VR_I$, $VR_{II}$, or $VR_{III}$ can be acted upon with an erasing pulse or a freely selectable setting value Da, although in each case only a single erasing key L, one setting key ST, and one input unit EE is used. It is obvious that it lies within the scope of the invention to allocate to each of the up-down counters $VR_I$, $VR_{II}$ or $VR_{III}$ an erasing key L, a setting key ST, and an input unit EE of its own. The multiplexer $MX_2$, of course, is then no longer required.

This preferred embodiment also includes a power fail circuit VL, with the aid of which an optical and/or acoustic warning is triggered after power has been interrupted and the counter is again set in operation.

The power fail circuit VL serves to assure the correct operation of the counter of the invention in the event that the external supply voltage of the system is interrupted. When operation is resumed after an interruption of the supply voltage, the power fail circuit VL triggers a warning, for example, a blinking of the indicator A. The operator is informed by this warning system that the entire system is operating faultily due to interruption of the supply voltage. The warning is maintained until a pulse is sensed at the output of the zero point pulse generator NA indicating that the absolute machine zero point has been passed. The reference pulse RI' simultaneously sets the counter $VR_I$ to zero and resets the power fail circuit VL. Since an accurate absolute reference point has been restored, the warning is no longer needed, and the previously blinking indicator A is now restored to continuous operation.

It is advantageous to provide this counter with an additional internal voltage supply such as a battery or an accumulator, which supplies power to both the measuring system and also the counters $VR_I$, $VR_{II}$, and $VR_{III}$ so that the contents of the counters $VR_I$, $VR_{II}$, and $VR_{III}$ may be accurately maintained during power failures.

Further, with the counter described, it is possible to correct possible errors in a simple manner, as for example when errors are present in the guides of the relatively moving objects or in the grid scale G of the measuring system. Correction values can be determined by special measurement and permanently stored in a memory unit (not shown), allocated to particular absolute position values and computationally taken into consideration.

The absolute position values mentioned can be found at any time with the aid of coded reference marks RI (code track not represented) of the grid scale G and can be corrected with the correction values mentioned, so that the counter $VR_I$ is corrected for these particular absolute position values. To each absolute position value there is allocated a previously determined correction value that is stored in a predetermined storage location. A computer (not shown) is preferably used to recognize the reference marks and perform the correction.

The electronic counter of the present invention can also be used advantageously with numerically controlled machines. Of course it should be understood that various changes and modifications to the preferred embodiment described herein will be apparent to those skilled in the art. Such changes and modifications can be made without departing from the spirit and scope of the present invention and without diminishing its attendant advantages. It is, therefore, intended that such changes and modifications be covered by the following claims.

I claim:

1. An electronic counter system for an incremental measuring device for measuring the position of a first object relative to a second object, said counter system comprising:

first counter means for storing any of a plurality of position values representative of the position of the first object measured in a first reference frame;

first means for setting the first counter means by storing a first pre-selected position value in the first counter means in order to set the zero point of the first counter means to correspond to said first reference frame;

second counter means for storing any of a plurality of position values representative of the relative position of the first object measured in a second reference frame;

second means for setting the second counter means by storing a second pre-selected position value, independent of said first pre-selected value, in the second counter means in order to set the zero point of the second counter means to correspond to said second reference frame;

means for utilizing the position values stored in first and second counter means; and switching means for selectively and alternately connecting the first and second counter means to the utilizing means.

2. The counter system of claim 1 wherein the first reference frame is an absolute reference frame and the counter system further includes:

means for sensing a first absolute position of the first object relative to the second object; and means, responsive to the sensing means and coupled to the first setting means, for activating the first setting means to cause said first pre-selected position value to be stored in the first counter means when said first absolute position is sensed by the sensing means.

3. The counter system of claim 2 wherein the measuring device is powered by a supply voltage and the counter further includes power fail circuit means, responsive to the sensing means, for generating a warning signal when the measuring device is operated following an interruption of the supply voltage, said circuit means operating to maintain the warning signal until the sensing means senses said absolute position of the first object.

4. The counter system of claims 1, 2 or 3 further including a battery coupled to the measuring device in the event of power failure to maintain proper functioning of the first and second counter means.

5. The counter system of claim 2 wherein the sensing means includes means for sensing a plurality of absolute positions and the counter system further includes means responsive to the sensing means, for correcting the position value stored in the first counter means when each of said plurality of absolute positions are sensed by the sensing means.

6. The counter system of claim 5 further including means for storing a plurality of correction values, wherein the correcting means is responsive to the stored correction values.

7. The counter system of claim 5 further including:
means for storing a plurality of pre-determined correction values, each correction value associated with one of the plurality of absolute positions; and
means, responsive to the sensing means and to the storing means, for utilizing the respective correction value to correct the position value stored in the first counter means when each of said plurality of absolute positions is sensed by the sensing means.

8. In an incremental measuring device for measuring the position of a first object with respect to a second object, said device including means for generating a plurality of pulses indicative of relative movement between the first and second objects, the improvement comprising:
a first counter responsive to the plurality of pulses to maintain a first count indicative of the position of the first object with respect to the second object in a first reference frame;
first means for selectively storing a first pre-selected value in the first counter to set the zero point of the first reference frame;
a second counter responsive to the plurality of pulses to maintain a second count indicative of the position of the first object with respect to the second object in a second reference frame;
second means, operable independently of the first storing means, for selectively storing a second pre-selected value, independent of the first pre-selected value, in the second counter to set the zero point of the second reference frame;
display means; and
switching means for selectively and alternately connecting the first counter and the second counter to the display means such that either the first count or the second count is displayed by the display means.

9. The improvement of claim 8 wherein the first reference frame is an absolute reference frame and the counter system further includes:
means for sensing a first absolute position of the first object relative to the second object; and
means, responsive to the sensing means and coupled to the first setting means, for activating the first setting means to cause said first pre-selected position value to be stored in the first counter means when said first absolute position is sensed by the sensing means.

* * * * *